Aug. 5, 1930.  J. H. HOERN  1,772,082
DEVICE FOR ASSEMBLING AND HOLDING PISTON RINGS FOR MACHINING OPERATIONS
Filed June 29, 1929  4 Sheets-Sheet 1
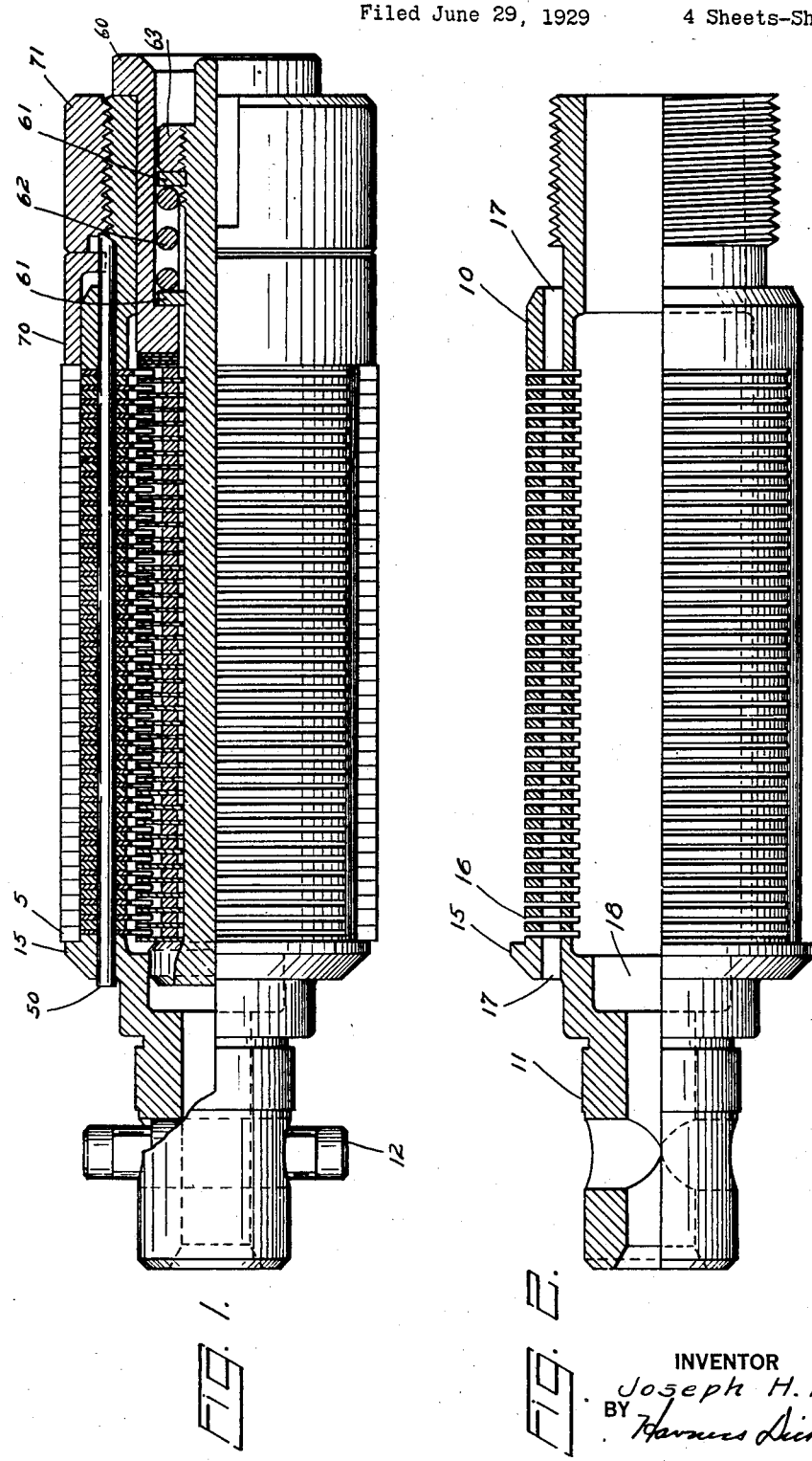
INVENTOR
Joseph H. Hoern.
BY
ATTORNEY

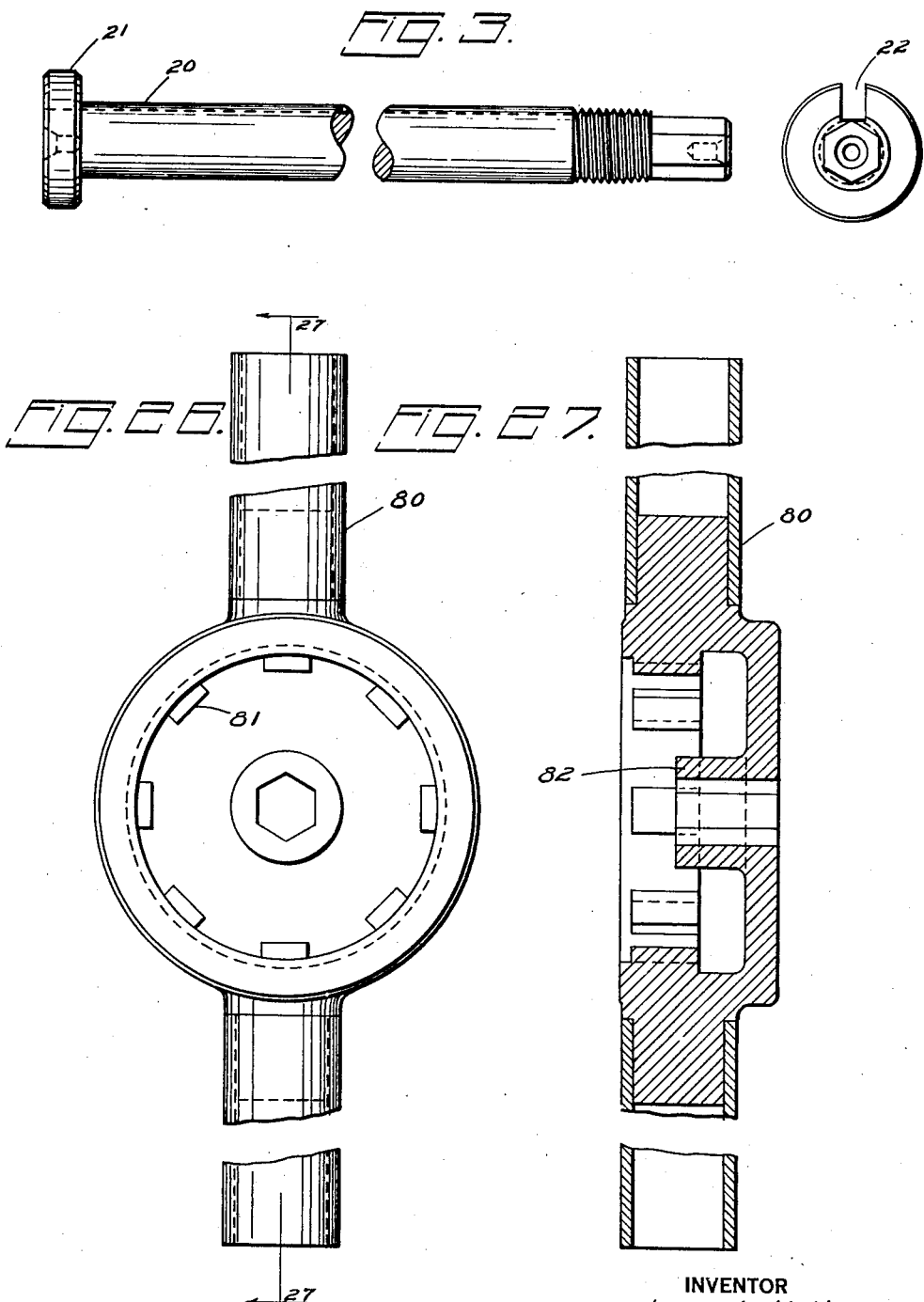

Aug. 5, 1930.  J. H. HOERN  1,772,082
DEVICE FOR ASSEMBLING AND HOLDING PISTON RINGS FOR MACHINING OPERATIONS
Filed June 29, 1929   4 Sheets-Sheet 3

INVENTOR
Joseph H. Hoern.
BY
ATTORNEY

Aug. 5, 1930.  J. H. HOERN  1,772,082
DEVICE FOR ASSEMBLING AND HOLDING PISTON RINGS FOR MACHINING OPERATIONS
Filed June 29, 1929    4 Sheets-Sheet 4
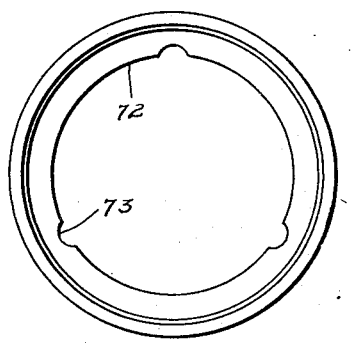
FIG. 10.
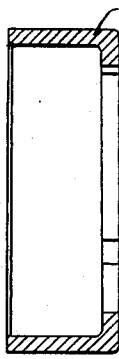
FIG. 11.
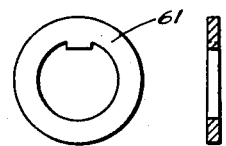
FIG. 22.
FIG. 23.
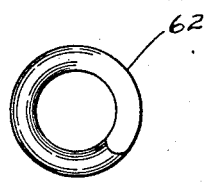
FIG. 20.
FIG. 21.
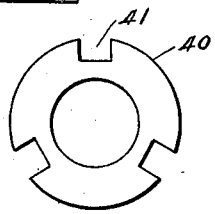
FIG. 16.
FIG. 17.
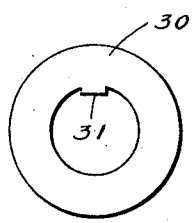
FIG. 14.
FIG. 15.
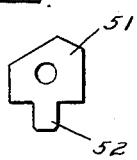
FIG. 18.
FIG. 19.
FIG. 24.
FIG. 25.
INVENTOR
Joseph H. Hoern.
BY
ATTORNEY Patented Aug. 5, 1930

1,772,082

UNITED STATES PATENT OFFICE

JOSEPH H. HOERN, OF SAGINAW, MICHIGAN, ASSIGNOR TO WILCOX-RICH CORPORATION, A CORPORATION OF MICHIGAN

DEVICE FOR ASSEMBLING AND HOLDING PISTON RINGS FOR MACHINING OPERATIONS

Application filed June 29, 1929. Serial No. 374,753.

The principal object of my invention is to provide a novel device upon which a plurality of piston rings or the like may be assembled and centered and held for the operation of machining the outside diameter of the rings.

Another object of my invention is to provide a device on which a plurality of piston rings or the like may be assembled for the outside machining operation and by which they may be individually centered and supported about a common axis.

With these and other objects in view, my invention consists in the arrangement, combination and construction of the various parts of my improved device, as described in the specification, claimed in my claims, and shown in the accompanying drawings, in which:

Fig. 1 is a view partly in section of a mandrel assembly embodied in my invention.

Fig. 2 is a view partly in section of the shell portion of the mandrel shown in Fig. 1.

Fig. 3 is a plan view of the spindle member embodied in my mechanism.

Fig. 10 is an end elevation of the ring holding sleeve which fits over the left end of the device.

Fig. 11 is a sectional view of said sleeve shown in Fig. 10.

Fig. 14 is a plan view of one form of friction plate which is mounted upon the spindle member shown in Fig. 3.

Fig. 15 is a cross section of the friction plate shown in Fig. 14.

Fig. 16 is a plan view of another form of friction plate mounted upon the axial member shown in Fig. 3.

Fig. 17 is a cross section of the friction plate shown in Fig. 16.

Fig. 18 is a plan view of the cam or dog member which is operated by the friction plate shown in Fig. 16.

Fig. 19 is an edge elevation of the cam member shown in Fig. 18.

Fig. 20 is an end elevation of a coil spring which is mounted upon the spindle member shown in Fig. 3.

Fig. 21 is a plan view of the spring shown in Fig. 20.

Fig. 22 is a plan view of a washer which acts as a bearing plate for the spring shown in Fig. 20.

Fig. 23 is a cross section of the washer shown in Fig. 22.

Fig. 24 is a plan view of the cross pin which fits in the shank of the mandrel.

Fig. 25 is an end elevation of the cross pin shown in Fig. 24.

Fig. 26 is a plan view of the wrench used in assembling the mandrel.

Fig. 27 is a view taken on the line 27—27 of Fig. 26.

Heretofore it has been the practice, in assembling and holding piston rings for machining the outside diameter, to mount a plurality of the rings upon a solid mandrel having an outside diameter slightly less than the least inside diameter of the rings, and then to clamp the rings tightly against one another lengthwise of the mandrel to hold them from turning during the machining operation. Owing to the fact that the inside diameters of the rings as cast frequently vary, it is not possible to assemble them on the mandrel, in the time allowed the operator, so that they will all be concentric to the axis thereof. Those rings having an inside diameter substantially greater than the outside diameter of the mandrel will frequently be positioned eccentric to the mandrel and the other rings. This results in having one part of the eccentrically held ring protruded beyond the surface of adjacent rings and the other part either in or withdrawn beneath the plane of the adjacent ring surfaces. Consequently the protruding part of the eccentrically held ring is machined more than the other part, which produces a ring having a wall of non-uniform thickness. It is then necessary to either scrap the ring or subject it to another machining operation to even up the wall thickness. It has been the practice to allow sufficient extra metal in the castings to permit the extra machining operation when necessary.

I have overcome this difficulty by providing a mandrel which automatically disposes and secures each ring concentric with a common axis, in the process of assembly. A substantial saving in material, machinery and labor is thereby made possible.

Figure 4:
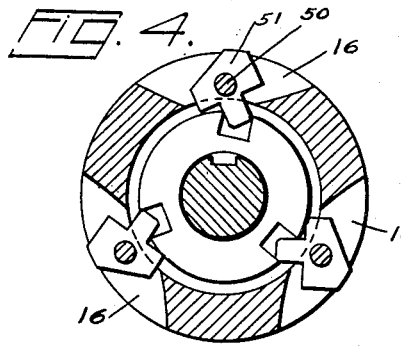
Fig. 4 is a sectional view taken on the line 4—4 of Fig. 1.
Figure 5:
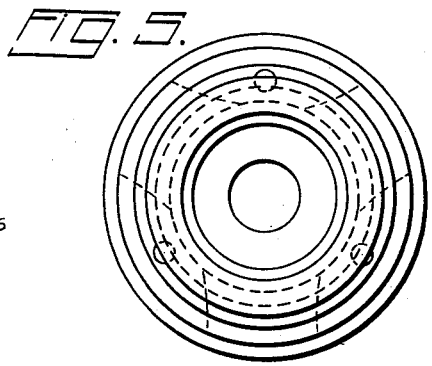
Fig. 5 is an end view of the left end of the device as shown in Fig. 2.
Figure 7:
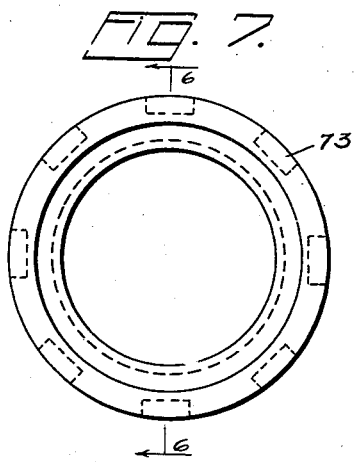
Fig. 7 is an end elevation of the collar shown in Fig. 6.
Figure 6:
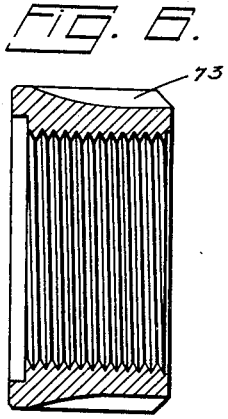
Fig. 6 is a cross section of the securing collar which turns upon the left end of the device.
Figure 13:
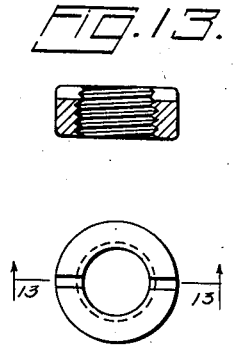
Fig. 13 is a cross section of the nut shown in Fig. 12.
Figure 12:
Fig. 12 is an end elevation of the nut which fits on the spindle member shown in Fig. 3.
Figure 8:
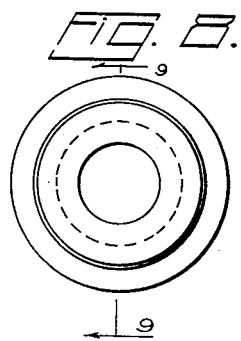
Fig. 8 is an end elevation of the sleeve which fits in the left end of the device.
Figure 9:
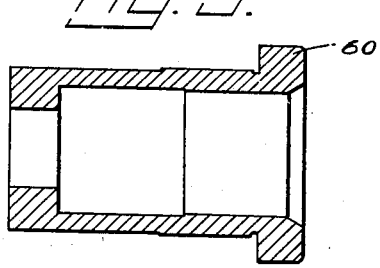
Fig. 9 is a cross sectional view of the sleeve.

My device comprises a hollow shell portion designated generally by the numeral 10, having a reduced shank portion 11 at one end thereof in which a cross pin 12 for securing the shank in a chuck may be mounted. The head portion of the mandrel is provided with an annular shoulder 15 against which the rings are clamped. The body portion of the mandrel is in the form of a hollow cylinder having an outside diameter slightly less than the inside diameter of the rings to be mounted thereon. Three longitudinal rows of transverse radial slots 16 are cut through the body portion of the mandrel and the rows are equally spaced from each other about the circumference of the mandrel as shown clearly in Fig. 4. The slots in each row are so spaced from each other and are of such a width that when the rings which are designated generally by the numeral 5 are mounted upon the mandrel, the central portion of each one of them covers one of the slots 16 in each of the three rows.

As shown in Fig. 1, a hole 17 is drilled lengthwise of the body portion of the mandrel and centrally of each row of slots. The left end of the mandrel as shown in Figs. 1 and 2, has a reduced threaded portion which is adapted to receive the various securing sleeves hereinafter described.

Positioned in the holes 17 which extend longitudinally through the slotted portions of the shell of the mandrel are pins 50, and upon these pins are mounted the cam members 51 shown in Fig. 18. One cam member is positioned in each slot and is free to turn upon the pin 50. The cam members 51 are provided with shank portions 52 which extend into the hollow portion of the mandrel. The outwardly facing end of the cam member is so shaped that when it is rotated in one direction about the pin 50 it will not protrude out of the slot in which it is positioned, and when it is turned in the opposite direction upon the pin 50 a portion of it will protrude from the slot and engage the inner face of the piston ring which is positioned over the slot.

Within the mandrel is positioned a spindle member 20 which has a round headed portion 21 adapted to fit and rotate in a recess 18 in the head of the mandrel, the spindle member 20 is maintained concentric with the mandrel by the head 21 and the recess 18. The spindle 20 is provided with a longitudinal keyway 22, and mounted alternately thereupon are the friction plates 30 and 40 (Figs. 14 and 16). The friction plates 30 are provided with a key 31 which fits in the key way 22 of the spindle 20 and causes the plate 30 to rotate with the spindle 20. The friction plates 40 are free to rotate upon the spindle 20 and they are provided with outwardly facing and equally spaced notches 41.

The friction plates 30 and 40 are so arranged upon the spindle 20 that the plates 40 are directly beneath the slots 16, with the notches 41 in position to engage the shanks 52 of the cams 51.

The fixture is assembled by inserting the spindle 20 with the friction plates 30 and 40 arranged thereon into the left end of the mandrel and positioning the head 21 thereof in the recess 18 in the head of the mandrel. The cams 51 are then assembled upon the rods 50 with their shanks 52 registering with the slots 41 in the friction plates 40. An internal sleeve member 60 is inserted in the left end of the mandrel as shown in Fig. 1, and around the end of the spindle 20. The inner end of the member 60 is provided with a reduced bore which forms a bearing for the spindle 20. A keyed washer 61 then is placed upon the end of the spindle 20 and against the wall of the inner end of the member 60. The coil spring 62 is then placed upon the end of the spindle 20 and bears at one end against the inner washer 61. Another washer, similar to the washer 61, is then placed upon the end of the spindle 20 against the outer end of the spring 62 and a securing nut 63 is then turned upon the threaded end of the spindle 20 and turned down against the outer washer 61 to regulate the tension of the spring 62 and consequently the pressure against the friction plates 30 and 40. The outer end of the spindle 20 is reduced in the shape of a hexagon in order that a manipulating wrench may be applied, as hereinafter explained. The rings 5 are then placed upon the mandrel and against the shoulder 15 until each of the slots in the mandrel is covered by a ring. A sleeve 70 is then slipped upon the end of the mandrel with its edge bearing against the outermost ring, and a threaded collar 71 is then turned upon the threaded end of the mandrel and against the end of the sleeve 70, forcing the sleeve 70 to crowd the rings tightly together and against the shoulder 15. The outer end of the sleeve 70 is provided with an inwardly extending flange 72 shown in Fig. 10, in which are cut away portions 73 adapted to fit over the ends of the rods 50 and to prevent the sleeve 70 from turning on the mandrel. The wrench shown in Figs. 26 and 27 is next applied to the left end of the mandrel. The threaded collar 71 is provided with longitudinal slots 73 in its outer surface which are adapted to receive the internal ribs 81 of the socket wrench 80. The socket wrench 80 is provided with a second internal socket 82 which is adapted to fit the hexagonal end of the spindle 20.

When the wrench is applied and turned to tighten the collar 71 and thus clamp the rings 5 securely upon the mandrel, the spindle 20 is also caused to turn by means of the socket wrench 82. The turning of the spindle 20 will cause the friction plates 30 which are attached thereto, to turn and to carry with them by means of friction the plates 40 which engage the shanks 52 of the cams 51, which will cause the outer edges of the cams to work through the slots 16 and engage the inner surfaces of the piston rings 5. As there are three equally spaced cams for each piston ring whose supports are concentrically arranged relative to the mandrel, each ring will be provided with a three-point radial support and will thereby be positioned concentrically relative to the mandrel. The cams are permitted to adapt themselves to the rings of unequal internal diameter by means of the friction plates 40 which will, when the movement of the cams is checked by the rings 5, slip between the plates 30. This provides an automatically adjustable support for each ring. Equal pressure will be exerted against each ring as the pressure against the friction plates is regulated entirely by means of the spring 62, the nut 63, and the sleeve 60.

When it is desired to release the rings from the mandrel the wrench 80 is applied to back off the collar 71, and also to reversely rotate the spindle 20 and the friction plates 40, which will cause the cams 51 to retract through the slots 16. The collar 71 may be then turned off the mandrel entirely and the sleeve 70, and the rings removed.

Formal changes may be made in the specific embodiment of the invention described without departing from the spirit or substance of the broad invention, the scope of which is commensurate with the appended claims.

What I claim is:

1. A centering device for rings or the like, comprising a hollow mandrel adapted to support a plurality of rings upon its surface and having a plurality of circumferentially spaced slots for each ring position, a rotatable member longitudinally positioned in said mandrel, and automatically adjustable means cooperating with said rotatable member and operable by the rotation thereof and through said slots for positioning and securing each ring separately in a concentric position relative to the axis of said mandrel.

2. A centering device for rings or the like, comprising a hollow mandrel adapted to support a plurality of rings upon its surface and having a plurality of circumferentially spaced slots for each ring position, a rotatable member longitudinally positioned in said mandrel, automatically adjustable means cooperating with said rotatable member and operable by the rotation thereof and through said slots for positioning and securing each ring separately in a concentric position relative to the axis of said mandrel, and means for clamping rings upon said mandrel in side abutting relation.

3. A centering device for rings or the like comprising a hollow mandrel adapted to support a plurality of rings upon its surface and having a plurality of circumferentially spaced slots for each ring position, a rotatable member longitudinally positioned in said mandrel, automatically adjustable means cooperating with said rotatable member and operable by the rotation thereof and through said slots for positioning and securing each ring separately in a concentric position relative to the axis of said mandrel, and means for securing said rotatable member and the ring adjusting means cooperating therewith in any adjusted position.

4. A centering device for rings or the like, comprising a hollow mandrel adapted to support a plurality of rings upon its surface and having a plurality of circumferentially spaced slots for each ring position, a rotatable member longitudinally positioned in said mandrel, automatically adjustable means cooperating with said rotatable member and operable by the rotation thereof and through said slots for positioning and securing each ring separately in a concentric position relative to the axis of said mandrel, means for clamping rings upon said mandrel in side abutting relation, and means for securing said rotatable member and the ring adjusting means cooperating therewith in any adjusted position.

5. A centering device for rings or the like, comprising a hollow ring support having a plurality of circumferentially spaced slots for each ring position, means working outwardly through said slots for engaging and positioning each ring separately and concentrically with respect to the axis of said support, and positively adjustable means in said support for operating said ring engaging means.

6. A centering device for rings or the like comprising a hollow support having individual ring positions thereon, and having circumferentially spaced radial openings leading to said positions, means working through the openings to each ring position for positioning each ring concentrically to the support independently of other rings, and positively adjustable compensating actuating means in said support for said ring positioning means.

7. A centering device for rings or the like comprising a hollow ring support having a plurality of circumferentially spaced slots for each ring position, means in each set of slots for positioning and supporting each ring separately and concentrically with respect to the axis of said support, a rotatable spindle positioned longitudinally in said support, separated members on said spindle for engaging each set of ring positioning means simultaneously and independently, and means carried by said spindle for actuating said separated members by surface friction therewith.

8. A centering device for rings or the like comprising a hollow ring support having a plurality of circumferentially spaced openings therein for each ring position, cam members in each set of openings adapted upon actuation to position and secure the ring in register therewith concentrically with respect to the axis of said support, a spindle positioned within said support and co-axial therewith, a plurality of plates slidably keyed to said spindle, a plurality of other plates rotatably mounted on said spindle between and in frictional relation with said keyed plates and each engaging only cam members in register with a single ring position, and means for regulating the friction between said keyed plates and said cam engaging plates.

9. A centering device for rings or the like comprising a hollow ring support having a plurality of circumferentially spaced slots for each ring position, means in each set of slots for positioning and supporting each ring separately and concentrically with respect to the axis of said support, a rotatable spindle positioned longitudinally in said support, separated members on said spindle for engaging each set of ring positioning means simultaneously and independently, means carried by said spindle for actuating said separated members by surface friction therewith, a non-rotatable sleeve and a threaded collar on the end of said support for clamping rings thereon in side abutting relation, and a wrench adapted to simultaneously engage said collar and the end of said rotatable spindle for simultaneously actuating said clamping and centering devices.

10. A centering device comprising a hollow mandrel adapted to support a plurality of piston rings in side abutting relation and having a plurality of circumferentially spaced slots therein in register with each ring position, a cam pivotally supported in each slot, a spindle rotatably positioned in said mandrel and concentric therewith, friction plates keyed to said spindle, complementary friction plates rotatably mounted on said spindle between said keyed plates and having perimetral notches engaging said cams, one of said rotatable plates being in register with each set of circumferentially spaced slots and engaging only the cams in one set of slots, and adapted upon rotation in one direction to actuate said cams to position the ring in register with the cams concentrically with respect to said mandrel, and upon rotation in the other direction to move said cams out of engagement with said ring, and adapted to slip between said keyed plates when encountering a predetermined resistance from said cams.

JOSEPH H. HOERN.